Dec. 25, 1928.

C. W. DAVIS ET AL 1,696,528

CONTACT SCREEN HOLDER

Filed April 15, 1927

C. W. Davis & G. B. Taylor Inventors

By their attorney

Patented Dec. 25, 1928.

1,696,528

UNITED STATES PATENT OFFICE.

CLARK W. DAVIS, OF SWARTHMORE, PENNSYLVANIA, AND GUY B. TAYLOR, OF WILMINGTON, DELAWARE, ASSIGNORS TO E. I. DU PONT DE NEMOURS & COMPANY, OF WILMINGTON, DELAWARE, A CORPORATION OF DELAWARE.

CONTACT-SCREEN HOLDER.

Application filed April 15, 1927. Serial No. 184,051.

This invention relates to holders for screens and more particularly relates to a holder for the contact, or catalyst, screen or gauze used in ammonia oxidation apparatus of the general broad type disclosed in U. S. Patent 1,321,376, Jones and Parsons, November 11, 1919. In this type of apparatus a catalyst screen is placed within a converter chamber; and ammonia and air are passed into the chamber and, upon contact with the catalyst, the ammonia is oxidized into oxids of nitrogen, and nitric acid. The present invention, while not restricted thereto, has particular application to holders for such screens.

In the practice of the Jones and Parsons process the screen and its holder are commonly subjected to high temperature, with resulting rapid deterioration of the holder unless such deterioration is carefully provided against. We have devised a holder of such character that deterioration is substantially provided against. It is a major object of the invention to provide such a holder, and is also an object to provide an ammonia oxidation assembly embodying such a holder.

Figure 1:
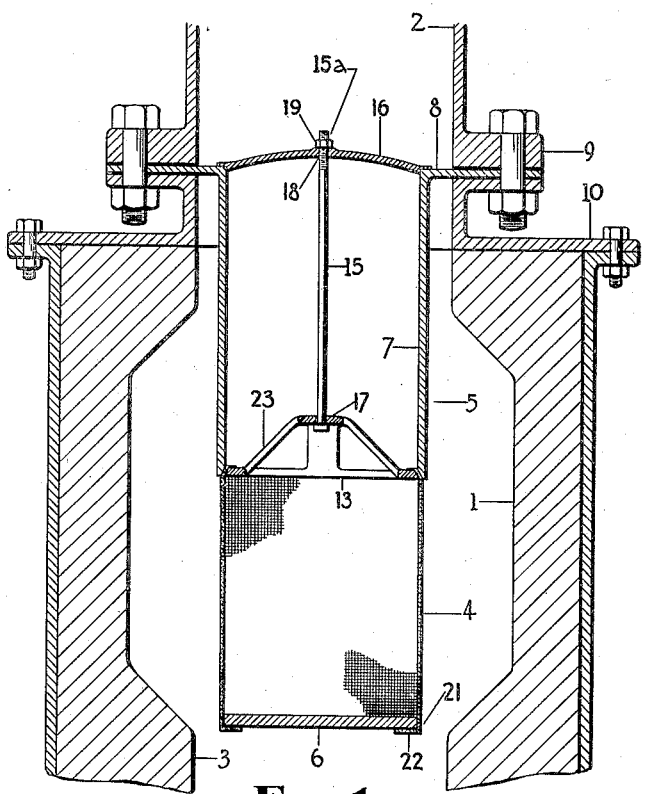
Figure 3:
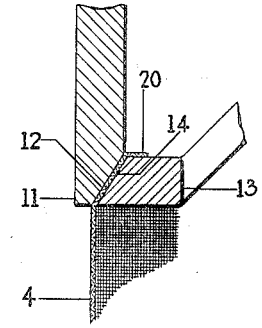
Figure 2:
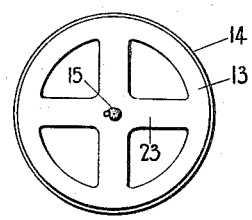

In the accompanying drawing:—Figure 1 is a vertical diametrical section of a converter or burner embodying the invention; Figure 2 is a top view of the clamping member or wedge ring; and Figure 3 is a fragmental section on a larger scale, illustrating the clamping means.

Referring now to the drawings:—The apparatus in general comprises a converting or oxidizing chamber 1 having the inlet 2 and outlet 3, the catalyst screen 4, and the screen holder 5. The screen is, desirably, of platinum gauze or the equivalent, cylindrical in shape, closed at the bottom by a plate 6, of, say, silica, and formed of any desired number of turns of material. The material of the entire holder is preferably nickle, although other metals can be used. In use, a suitable mixture of air and ammonia is introduced through the inlet 2 into the interior of the screen 4, and, passing through the screen, is converted into oxids of nitrogen and nitric acid which pass from the apparatus through the outlet 3.

In detail, as here shown, the holder 5 comprises the depending supporting cylindrical shell or sleeve 7 having the flange 8 for clamping between the flanges 9 and 10 of the inlet pipe 2 and the chamber 1. The periphery of the lower rim 11 of the shell 7 is bevelled or tapered on its inner face throughout its length as particularly indicated at 12, Figure 3. Mating with the said rim 11 is a clamp or wedge ring 13 cooperatively bevelled throughout its periphery as indicated at 14, Figure 3. For conveniently supporting and adjusting the ring 13, there is provided the supporting rod 15 supported by the bridge 16 carried by the shell 7. The rod is fast-connected to the hub 17 of the wedge ring, passed through the aperture 18 of the bridge 16, and provided with the nut 19, threaded to the rod at 15ª and abutting the bridge, whereby the ring 13 may be drawn against the rim 11 or permitted to move away from the same by turning of the nut 19, as will be evident.

The screen 4 has its upper edge or periphery 20 inserted between the bevels 12 and 14 and clamped therebetween by the drawing upward of the ring 13 upon proper turning of the nut 19. As here shown the lower periphery 21 of the screen is in-turned at 22 to support the closing plate 6. Access to the holder and screen may, of course, be obtained by the removal of the inlet pipe 2.

It is to be particularly noted that by the above arrangement all adjusting parts, as the ring 13, rod 15, nut 19, threads 15ª, and so forth, are located, not in the hot gas zone but in the cooler ammonia zone. Thus they are so placed as to be out of contact with the nitric oxides, which condition is, plainly, conducive to long life and minimum deterioration. Furthermore, the wedge ring 13 is so heavily constructed, and the screw parts that hold it in place are so far away from the heat that they will readily resist the heat.

Preferably, and as illustrated, the spider arms 23 of the ring 13 are arched, as is also the bridge 16. By arching these parts, expansion is taken care of, the holder, particularly the ring 13, does not warp out of shape, and their removal is thereby made much simpler. However, it will be understood that the parts need not necessarily be arched.

Although a central supporting rod 15 and arched bridge 16 have been shown, and are preferred, it giving a construction whereby the holding nut, as 19, is placed as far away from the heat as possible, it will be understood that other provisions for holding and moving the ring 13 may be used, as rods hanging from lugs on the inner surface of the holder and connected with the ring in any desired manner, or several rods hanging from an arch at the top of the holder, or what not.

Although a cylindrical holder has been particularly described, a cylindrical screen being usual, it will be understood that holders of other shapes may be used if desired, preferably to mate the screen to be used, as flat, polygonal or what not.

We claim:

1. In a screen holder, an open-ended cylindrical shell having the peripheral edge of one end interiorly tapered, a circular member exteriorly peripherally cooperatively tapered and adapted for reception within the said end of the shell to place the tapers in cooperative clamping relation for the reception and clamping of a screen, and means for clamping the members together; such means comprising a bridge at the other end of said shell, a rod connected with the central portion of said circular member and extending to said bridge, and means at said bridge for drawing said rod and circular member toward said bridge thereby to move said member into clamping position with said tapered edge of said cylindrical shell.

2. In a screen holder, an open-ended cylindrical shell having the peripheral edge of one end interiorly tapered, a circular member exteriorly peripherally cooperatively tapered and adapted for reception within the said end of the shell to place the tapers in cooperative clamping relation for the reception and clamping of a screen, and means for clamping the members together; such means comprising a bridge at the other end of said shell, a rod connected with the central portion of said circular member and extending to said bridge, and means at said bridge for drawing said rod and circular member toward said bridge thereby to move said member into clamping position with said tapered edge of said cylindrical shell, said bridge and the central portion of said circular member being arched in a direction away from said clamping surface.

3. In an assembly for ammonia oxidation, in combination, an oxidizing chamber having an inlet aperture, an open-ended cylindrical sleeve suspended from the periphery of said aperture and depending within said chamber, the lower edge of said sleeve being interiorly peripherally tapered, a wedge ring exteriorly peripherally tapered for clamping cooperation with said tapered edge, means for forcing said clamping parts into clamping relation and arranged within said sleeve, and a cylindrical catalyst screen depending from the lower edge of said sleeve and having its upper edge clamped between said clamping parts.

4. In a screen holder, for holding an open-ended screen body to extend from said holder and form substantially a continuation of the body thereof, in combination, a shell-like open-ended holder body having the edge of its open end tapered, a cooperatively tapered ring-like member substantially unobstructed throughout its enclosed plane and adapted for clamping cooperation, taper-to-taper, with said holder body, to receive the periphery of a screen, and means for clamping the tapered members together, whereby the holder will hold a screen extending therefrom and present a substantially unobstructed passage thereinto.

5. In a screen holder, an open-ended cylindrical shell having the peripheral edge of one end tapered, a circular member cooperatively tapered and adapted for assembly with said shell to place the tapers in cooperative clamping relation for the reception and clamping of a screen, and means for clamping the members together; such means comprising a bridge at the other end of said shell, a rod connected with the central portion of said circular member and extending to said bridge, and means at said bridge for drawing said rod and circular member toward said bridge thereby to move said member into clamping position with said tapered edge of said cylindrical shell.

In testimony whereof we affix our signatures.

CLARK W. DAVIS.
GUY B. TAYLOR.